G. E. LE ROY.
Improvement in Fly-Traps.
No. 129,350. Patented July 16, 1872.
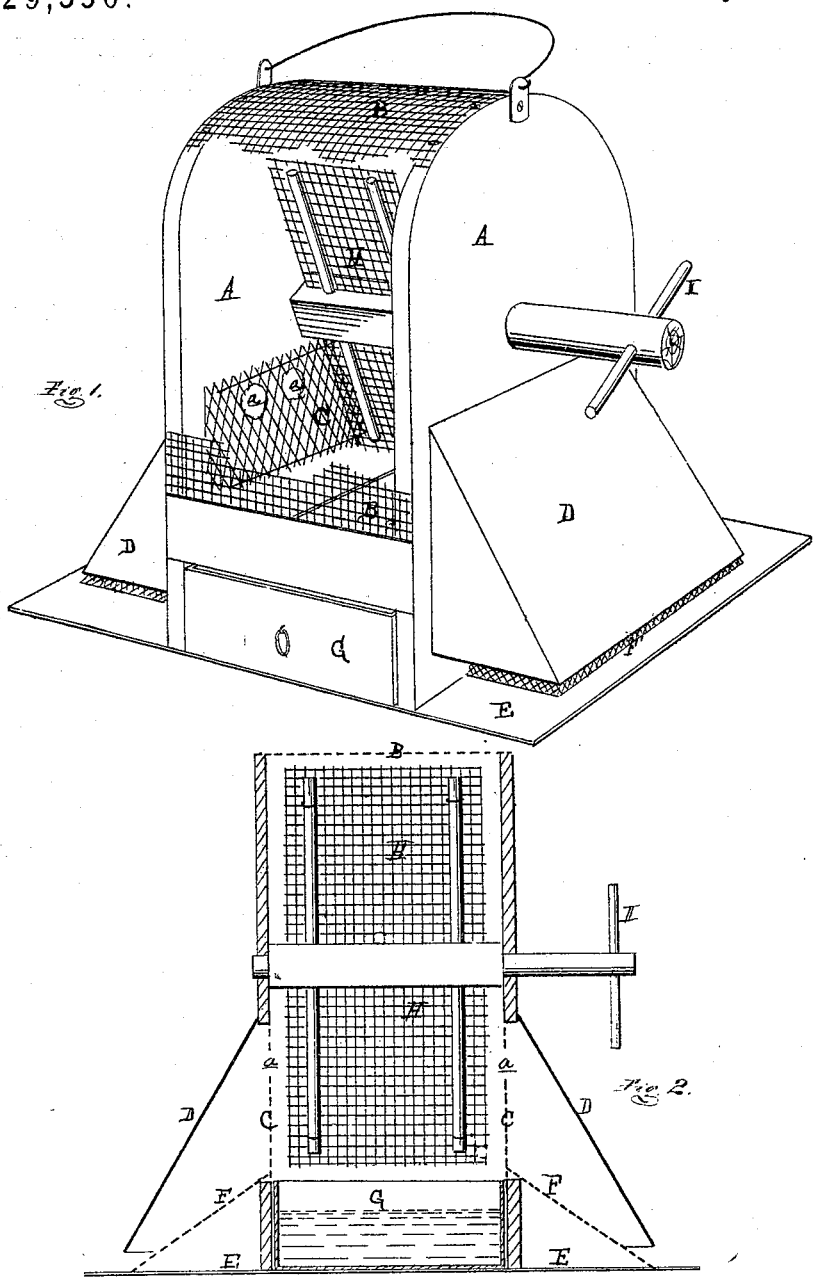

UNITED STATES PATENT OFFICE.

GEORGE E. LE ROY, OF SOUTH BEND, INDIANA, ASSIGNOR TO HIMSELF AND CALLAHILL M. GOODRICH, OF SAME PLACE.

IMPROVEMENT IN FLY-TRAPS.

Specification forming part of Letters Patent No. 129,350, dated July 16, 1872.

*To whom it may concern:*

Be it known that I, GEORGE E. LE ROY, of South Bend, in the county of St. Joseph and State of Indiana, have invented a new and useful Improvement in Fly-Traps; and I do declare that the following is a true and accurate description thereof, reference being had to the accompanying drawing and to the letters of reference marked thereon and being a part of this specification, in which—

Figure 1 is a perspective, and Fig. 2 is a vertical cross-section of my device.

Like letters indicate like parts in each figure.

The nature of this invention relates to an improvement in the construction of fly-traps, wherein the insects are not only caught but they are destroyed. The invention consists in the peculiar construction of the trap, and in the rotating fan, by means of which the insects are forced down into the pan where they are drowned.

In the accompanying drawing, A represents the two sides of the trap, to the edges of which is secured the wire-cloth B, the top of the sides being semicircular in form. Cut through the sides are rectangular openings C, which are covered on the interior of the sides with wire-cloth, which is punctured with one or more holes, $a$, of sufficient capacity to allow the insects freely to pass through. Covering these rectangular openings are the opaque shields D, which extend nearly to the floor E of the trap, leaving sufficient space between the floor and shields to allow the flies to enter and crawl up the inclined floor F, which is made of wire-cloth. Seeking the greater light the fly passes through the holes $a$ into the body of the trap. G is a water-tight pan fitting the bottom of the trap, but made so that it may be withdrawn when desired. This is designed to be filled with soap-suds or any other desired liquid. H is a rotating fan, whose wings are made of wire-cloth, and is provided with a crank, I, by means of which the fan may be rotated from the outside. The trap being partially filled with flies, the fan is rapidly rotated for a moment, when the flies are forced down into the liquid in the pan and drowned.

What I claim as my invention, and desire to secure by Letters Patent, is—

A fly-trap wherein the walls A A, wire-cloth covering B, openings $a$, shields D D, floor F, pan G, and rotating fan H are constructed and arranged to operate for the purposes as herein set forth.

GEORGE E. LE ROY.

Witnesses:
L. G. WELTON,
J. A. M. LAPIERRE.